Nov. 18, 1958  H. J. G. SCHADE  2,860,835
TILTABLE UNDERWATER MACHINE STRUCTURE
Filed July 2, 1956  2 Sheets-Sheet 1

INVENTOR:
Harald Schade
BY Erwin Salyer  ATTY.

United States Patent Office 2,860,835
Patented Nov. 18, 1958

2,860,835

TILTABLE UNDERWATER MACHINE STRUCTURE

Harald Joachim Georg Schade, Stuttgart-Bernhausen, Germany, assignor to Passavant Werke, Michelbacher Huette, near Michelbach, Nassau, Germany Application July 2, 1956, Serial No. 595,554

Claims priority, application Germany July 5, 1955

7 Claims. (Cl. 241—46)

This invention relates to machines mounted to operate below a head of water, and submersed in a body of water. From a more limited point of view this invention relates to water-submersed disposal machines, and more particularly water-submersed disposal or crushing machines for water purification systems.

Generally machines of the aforementioned character are being mounted on a bed of concrete situated at the bottom of a body of water to be purified. Inspection and maintenance of such machines is a costly operation since this requires removal of the machines from their bed on the bottom of a body of water which, in turn, requires draining off the water and calls also for a more or less elaborate crane system to lift the machine out of place.

It is, therefore, one object of this invention to provide water-submersed machines, and more particularly water-submersed machines for water purification or sewage disposal which are relatively easily accessible for purposes of inspection, maintenance, and repair.

Instead of lifting a water-submersed machine vertically out of a body of water, as by means of a crane, a water-submersed machine may also be raised above the water level by tilting it about a horizontal pivot. The tiltable water-submersed machines known heretofore are subject to a number of serious limitations. Since their frame is mounted on a bed situated at the bottom of a body of water, any work on their frame requires draining off the water by which it is normally covered. As a general rule, tilting of a water-submersed machine to and above the surface calls for a preliminary removal of pipes, cables, etc., before the machine can be lifted by tilting it upwardly. These relatively complex operations are particularly troublesome in water purification or sewage disposal systems because in these particular applications the presence of large amounts of solid foreign matter makes it necessary to obtain relatively frequently access to water-submersed machines such as pumps, and more particularly disposal and crushing machines.

It is, therefore, another object of this invention to provide water-submersed machines such as pumps, and particularly crushing machines for disposal of solid matter which can readily be tilted above the water level without the need of first draining off the body of water in which the machine is normally submersed, and without the need of disassembling many parts of the installation preparatory to lifting the machine out of the water.

Another object of the invention is to provide water-submersed machines such as, for instance, pumps, and more particularly crushing machines for sewage disposal and the like, whose housing opens automatically incident to raising of the machine out of the water so as to be instantly ready for inspection, maintenance, and repair when lifted above the water level.

Other objects and advantages of the invention will, in part, be obvious and in part appear hereinafter.

For a more complete understanding of the invention reference may be had to the following detailed description thereof taken in connection with the accompanying drawings, in which.

Figure 1:
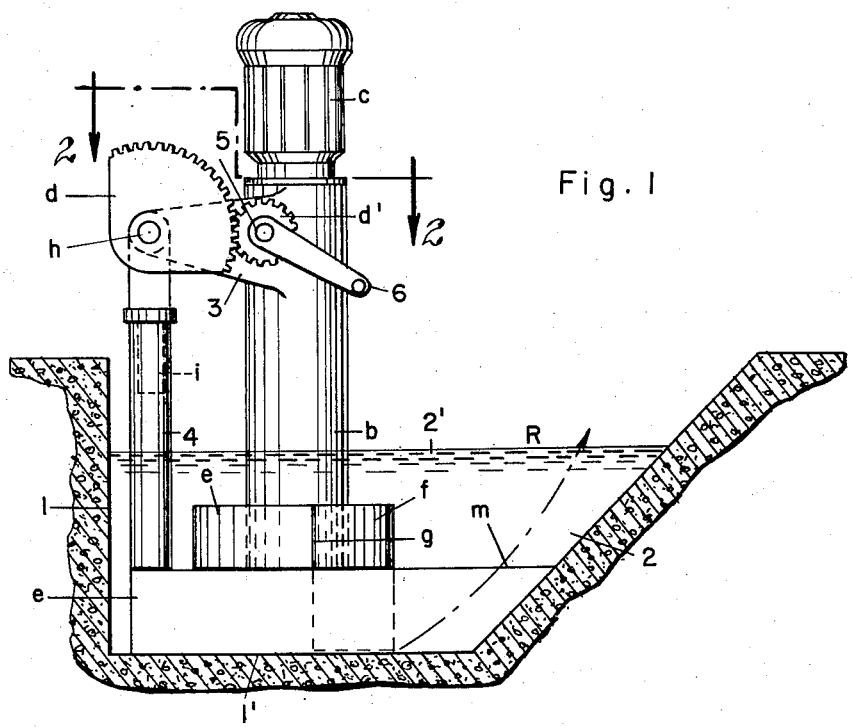
Fig. 1 is a section along 1—1 of Fig. 2 and shows a water channel in which a machine embodying the present invention is installed.
Figure 2:
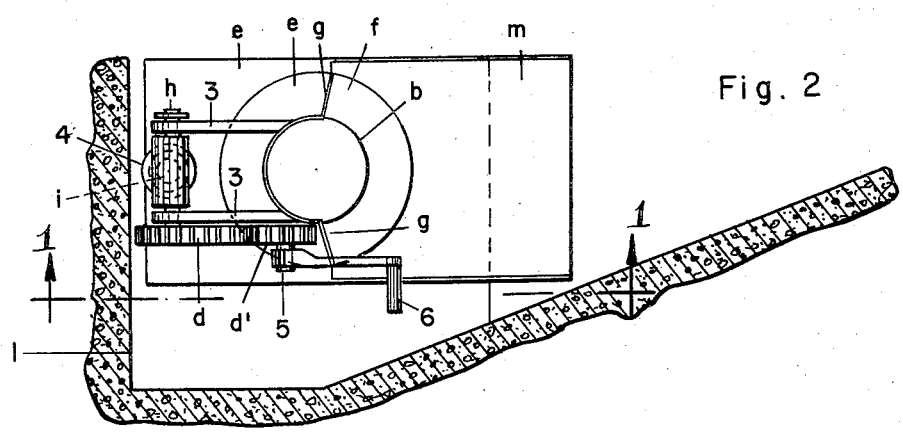
Fig. 2 is a section along 2—2 of Fig. 1.

Referring now to the drawings, and more particularly to Figs. 1 and 2 thereof, reference numeral 1 has been applied to indicate a bed for a body of flowing water 2. The vertical column $b$ supports on the top end thereof an electric motor $c$ and on the bottom end thereof a disposal or crushing machine $e$, $f$, preferably of the type disclosed and claimed in my copending patent application filed July 2, 1956, Ser. No. 595,556, for Crushing Machine. Motor $c$ is arranged at such a level as to always stay above the level $2'$ of the body of water 2. The part $e$ of the crushing machine, or of the frame thereof, is fixed, i. e. permanently secured to the bottom $1'$ of bed 1. Part $f$ of the crushing machine, or of the frame thereof, forms an integral part of column $b$. Reference letter $g$ has been applied to indicate the joint between the fixed or stationary part $e$ of the crushing machine frame and the movable part $f$ thereof. Column $b$ is provided with a pair of arms 3 projecting toward the bank of bed 2 and supported by a horizontal pivot $h$. Horizontal pivot $h$ is, in turn, supported by a vertical pivot $i$ which rests in the upper part of vertical pillar 4. Gear segment $d$ arranged in coaxial relation to pivot $h$ is likewise supported by pillar 4. Pinion $d'$ mounted on crank shaft 5 supported by column $b$ meshes with gear segment $d$ and is adapted to be operated by handle 6.

Upon rotation of handle 6 column $b$ pivots about fulcrum $h$ whereby part $f$ is being separated from part $e$ of the crushing machine, and can be raised above the level $2'$ of the body of water 2 for purposes of inspection, maintenance and repair.

The configuration of the structure or bank bounding the channel may be such as to preclude raising of the movable part $f$ of the crushing machine by a simple rotary motion. In such instances the movable part $f$ may nevertheless be raised above the water level by resorting to a composite motion about horizontal pivot $h$ and about vertical pivot $i$. Crank 5 must first be turned sufficiently to cause parting of parts $f$, $e$ and before column $b$ can be turned about the vertical pivot $i$.

As a general rule joint $g$ does not need to be closed by a gasket, or the like, since it can readily be kept sufficiently small to preclude substantial leakage of water from the inside of the machine to the outside thereof. If desired the width of joint $g$ can be minimized by provision of a gasket and/or by providing one of the two parts $e$, $f$ with a groove extending along joint $g$ and the other with a projection having the same shape as said groove and engaging said groove.

In both embodiments of the invention shown both frame structures $e$, $f$ are complementary forming jointly a housing for the water submersed machine. Column $b$ may be considered to be an upward extension of the movable housing part $f$, and an extension other than a tubular column could be substituted for column $b$. The width of housing $e$, $f$ where smallest is at least equal to that of extension or column $b$ or, in other words, the size of housing $e$, $f$ is relatively large compared to the size of the lever-forming extension used to move it to the surface of the water.

Figure 3:
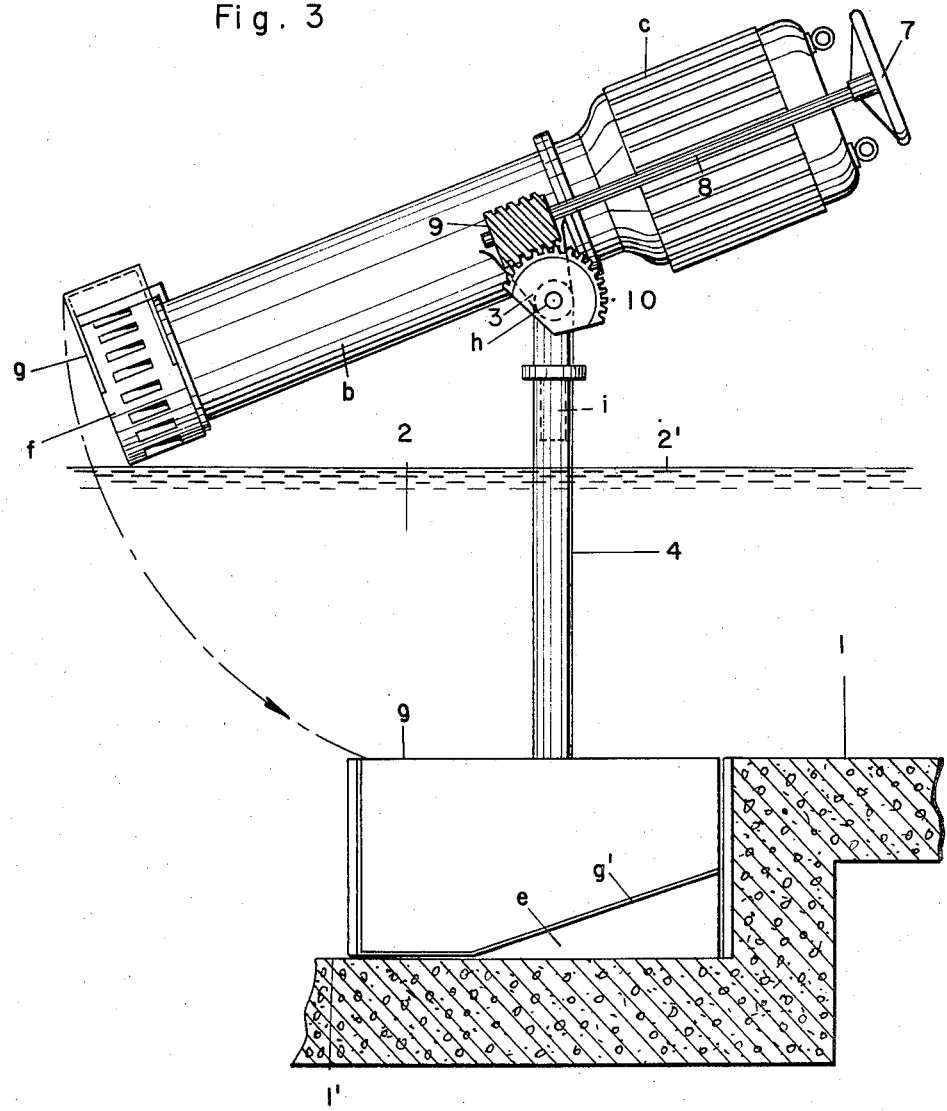
Fig. 3 is mainly a side elevation of a modification of the structure shown in Figs. 1 and 2, showing some parts in section.

The pinion $d'$ in the structure shown in Figs. 1 and 2 as well as the worm 9 shown in the structure of Fig. 3 are planet gears adapted to rotate about fulcrum $h$ while rotating about their own axes 5 and 8, respectively.

The crushing machine operates in the fashion of a radial pump inasmuch as it lifts water and solid matter axially upwardly and expels water and crushed solid matter radially outwardly. Foreign matter beyond the capacity of the crushing machine collects at the bottom of the frame thereof, and may be removed with a hoe from part m of the fixed frame structure.

For a more complete disclosure of the internal arrangements of parts inside of frame structures e, f reference may be had to my above referred-to copending patent application. In drawing Fig. 2 all the parts situated inside the circular line to which reference letter b has been applied—i. e. all the parts inside of column 2—have been omitted. The above referred to patent application discloses a crushing machine comprising a crankshaft having the dual function of being a crushing tool and an impeller. The crankshaft is being rotated about an axis parallel to its own axis, and consequently subjected to intense centrifugal action. The cranked portion of the crankshaft is situated inside of a cagelike structure constituted by a plurality of bars against which the cranked portion of the crankshaft is being thrown violently by centrifugal action. The crankshaft-housing cage has been clearly shown in Fig. 3 and indicated by reference character f. Reference character f' has been applied to indicate a portion of the spiral duct structure forming an outlet for water expelled radially outwardly from the crushing cage through the gaps formed between the crushing bars thereof, which portion of the duct structure is jointly movable with column b, forming an integral part of the latter.

It will be understood that although but two embodiments of the invention have been shown and described in detail, the invention is not limited thereto. It will also be understood that the structures illustrated may be modified without departing from the spirit and scope of the invention as set forth in the accompanying claims.

It is claimed:

1. An arrangement of a tiltable underwater operating machine in a body of water comprising, in combination, a first frame structure submersed in said body of water and fixedly mounted in position, a second frame structure complementing said first frame structure to jointly form a machine housing, an upward extension on said second frame structure, and pivot means for said extension arranged above the surface of said body of water for pivoting said extension about a horizontal axis to lift said second frame structure out of said body of water.

2. An arrangement as specified in claim 1 having a gear drive for pivoting said extension, said gear drive including a fixed gear arranged coaxially with respect to said pivot means, a movable gear meshing with said fixed gear fixedly mounted on said extension for joint pivotal movement therewith, and operating means for said movable gear.

3. An arrangement of a tiltable underwater operating machine in a body of water comprising, in combination, a first frame structure submersed in said body of water and fixedly mounted in position, a second frame structure complementing said first frame structure to jointly form a machine housing, an upward extension on said second frame structure, pivot means for said extension arranged above the surface of said body of water for pivoting said extension about a horizontal axis to lift said second frame structure out of said body of water, and additioanl pivot means for said first mentioned pivot means for jointly pivoting said first mentioned pivot means and said extension about a vertical axis.

4. An arrangement of a tiltable underwater operating machine comprising, in combination, means containing a body of water, said containing means including a bottom portion and side portions, a structure having a predetermined width projecting from a point above the surface of said body of water downwardly toward said bottom portion, pivot means arranged above said surface to pivot said structure about a horizontal axis to raise the lower end thereof above said surface, a machine housing arranged at the bottom of said body of water at least equal in width to said predetermined width, said housing comprising a first frame unit fixedly mounted on said bottom portion and a second frame unit complementing said first frame unit and forming an integral part of said structure to be jointly raised with said lower end thereof above said surface.

5. An arrangement of a tiltable underwater operating machine in a body of water comprising, in combination, a first frame structure submersed in said body of water and fixedly mounted in position, a second frame structure complementing said first frame structure to jointly form a machine housing, the juxtaposed surfaces of said first frame structure and of said second frame structure fitting together to minimize the gap formed between said first frame structure and said second frame structure, a vertical column of smaller width than said second frame structure supporting said second frame structure on the lower end thereof, and pivot means on said column arranged above the surface of said body of water for pivoting said column about a horizontal axis to lift said second frame structure out of said body of water.

6. In a disposal system the combination of means containing a body of water, said containing means including a bottom portion and side portions, a first column projecting from a point above the surface of said body of water vertically downward toward said bottom portion, an electric motor supported by said column at the top end thereof, a mechanical crushing machine adapted to be driven by said motor arranged at the bottom end of said column, said crushing machine having a housing including two complementary parts, one of said parts being fixedly anchored to said bottom portion and the other of said parts being supported by the bottom end of said column, a second vertical column, and pivot means supported by said second column arranged adjacent the top thereof to pivot said first column about a horizontal axis to raise said other of said parts above said surface of said body of water.

7. In a disposal system the combination of means containing a body of water, said containing means including a bottom portion and side portions, a first column projecting from a point above the surface of said body of water downward toward said bottom portion, an electric motor supported by said column adjacent the top end thereof, a mechanical crushing machine adapted to be driven by said motor arranged adjacent the bottom end of said column, said crushing machine having a housing including two complementary parts, one of said parts being fixedly anchored to said bottom portion and the other of said parts being supported by the bottom end of said column, a second column parallel to said first column, a first pivot supported by said second column adjacent the top thereof pivotally supporting said first column to enable said first column to be pivoted about a horizontal axis to raise said other of said parts above said surface of said body of water, a toothed gear arranged coaxially with respect to said pivot and fixedly supported by said second column, a planet gear meshing with said toothed gear and supported by said first column for joint pivotal motion with said first column about said horizontal axis, an operating mechanism for operating said planet gear, and a second pivot supporting said first pivot and said toothed gear to pivot said first column and said toothed gear jointly about a vertical axis.

References Cited in the file of this patent

UNITED STATES PATENTS

| 2,390,579 | Fritzberg | Dec. 11, 1945 |

FOREIGN PATENTS

| 386,432 | Great Britain | Jan. 19, 1933 |
| 875,603 | Germany | May 4, 1953 |